United States Patent [19]
Miller et al.

[11] Patent Number: 6,036,496
[45] Date of Patent: Mar. 14, 2000

[54] UNIVERSAL SCREEN FOR LANGUAGE LEARNING IMPAIRED SUBJECTS

[75] Inventors: Steven L. Miller, Pacifica; Bret E. Peterson, Lafayette; Athanassios Protopapas, San Francisco, all of Calif.

[73] Assignee: Scientific Learning Corporation, Berkeley, Calif.

[21] Appl. No.: 09/167,278

[22] Filed: Oct. 7, 1998

[51] Int. Cl.[7] .......................... G09B 19/00; G09B 19/06; G09B 1/00; G09B 19/04; G06K 9/00

[52] U.S. Cl. .......................... 434/156; 434/116; 434/157; 434/167; 434/178; 434/185; 704/271

[58] Field of Search ..................................... 434/116, 156, 434/157, 167, 178, 185; 704/270, 271

[56] References Cited

U.S. PATENT DOCUMENTS

| | | | |
|---|---|---|---|
| 5,813,862 | 9/1998 | Merzenich et al. | 434/185 |
| 5,927,988 | 7/1999 | Jenkins et al. | 434/116 |

*Primary Examiner*—Robert A. Hafer
*Assistant Examiner*—John Edmund Rovnak
*Attorney, Agent, or Firm*—James W. Huffman

[57] ABSTRACT

An apparatus and method for screening an individual's ability to process acoustic events is provided. The invention provides sequences (or trials) of acoustically processed target and distractor phonemes to a subject for identification. The acoustic processing includes amplitude emphasis of selected frequency envelopes, stretching (in the time domain) of selected portions of phonemes, and phase adjustment of selection portions of phonemes relative to a base frequency. After a number of trials, the method of the present invention develops a profile for an individual that indicates whether the individual's ability to process acoustic events is within a normal range, and if not, what processing can provide the individual with optimal hearing. The individual's profile can then be used by a listening or processing device to particularly emphasize, stretch, or otherwise manipulate an audio stream to provide the individual with an optimal chance of distinguishing between similar acoustic events.

30 Claims, 7 Drawing Sheets

UNIVERSAL SCREEN FOR LANGUAGE LEARNING IMPAIRED SUBJECTS

CROSS REFERENCE TO RELATED APPLICATIONS

This application is related to U.S. patent application Ser. No. 09/167279 (Docket SLC:827B) which is hereby incorporated by reference.

BACKGROUND OF THE INVENTION

1. Field of the Invention

This invention relates in general to the field of auditory testing of humans, and more specifically to a computer program for universally screening individuals for auditory discrimination problems associated with spoken language.

2. Description of the Related Art

Modern research indicates that up to ten percent of humans have language-learning impairments (LLI) resulting from the inability to accurately process short duration acoustic events at rates that occur in normal speech. Their trouble distinguishing among elements of speech is neurologically based and has far reaching consequences: academic failure, emotional and disciplinary problems, and possibly diminished lifelong achievement and self-image. No bracket of intelligence, race, gender or economic level is immune from this problem.

More specifically, people with LLI have difficulty detecting and identifying sounds that occur simultaneously or in close proximity to each other—a phenomenon known as "masking." Because of masking, people with LLI require sounds that are as much as 45 decibels more intense than preceding or subsequent masking noises to distinguish and understand them. In addition, people with LLI are consistently poorer at detecting a brief tone presented with a masking noise, particularly when the brief tone is turned on immediately prior to the masking noise. This phenomenon is called "backward masking." Similarly, when the brief tone is turned on immediately after the masking noise a similar decrease in detectability can occur. This phenomenon is called "forward masking". For a tone to be detected by a person with LLI in the presence of a masking noise, the tone must be separated in time or frequency from the masking noise.

The inability to accurately distinguish and process short duration sounds often cause individuals to fall behind in school. Since the individuals can't accurately interpret many language sounds, they can't remember which symbols represent which sounds. This deficiency causes difficulties in learning to read (translating from symbols to sounds), and in spelling (translating from sounds to symbols). In fact, it is common for an individual with LLI to fall two to three years behind his/her peers in speech, language and reading development.

One way individuals develop such auditory processing problems is from middle ear infections when they are young and beginning to develop the oral representations of language in the central auditory nervous system. For example, when a child has an ear infection, fluid can build up and block or muffle the sound wave entering the ear causing intermittent hearing loss. Even if the infection doesn't permanently damage the ear, the child's brain doesn't learn to process some sounds because it hasn't heard them accurately before, on a consistent basis. This typically occurs during a critical period of brain development when the brain is building the nerve connections necessary to accurately process acoustic events associated with normal speech.

Researchers believe that the auditory processing problem is essentially one of timing. Vowel sounds like /a/ and /e/ usually last at least 100 milliseconds and typically have constant frequency content. Consonants, on the other hand, typically have modulated frequency components, and last less than 40 milliseconds. Individuals with LLI cannot process these faster speech elements, especially the hard consonants like /t/, /p/, /d/ and /b/, if they occur either immediately before or after vowels, or if they are located near other consonants. Rather than hearing the individual sounds that make up a particular phoneme, individuals with LLI integrate closely associated sounds together over time. Since the duration of vowels are typically longer than consonants, the modulated frequency portions of consonants are often lost in the integration, an affect that may also hinder the resolution of the vowel, particularly short duration vowels.

This problem of abnormal temporal integration of acoustic events over time is not limited to individuals with LLI. Rather, the problem extends to stroke victims who have lost the neurological connections necessary to process speech, as well as to individuals raised in one country, having one set of language phonemes, and attempting to learn the language of another country, having a distinct set of language phonemes. For example, it is known that an individual raised in Japan is not often presented with phonemes similar to the English r's and l's, because those consonants are not common in the Japanese language. Similarly, there are many subtleties in the sounds made by a speaker of Japanese that are difficult to distinguish unless raised in Japan. The phonetic differences between languages are distinctions that must be learned, and are often very difficult. But, they are clearly problems that relate to the temporal processing of short duration acoustic events.

The above described temporal processing deficiency has little if anything to do with intelligence. In fact, some LLI specialists argue that brains choosing this different route by which to absorb and reassemble bits of speech may actually stimulate creative intelligence, but at the expense of speech and reading problems.

Recent studies have shown that if the acoustic events associated with phonemes that are difficult to distinguish, such as /ba/ and /da/, are slowed down, or that the consonant portion of the phonemes are emphasized, that individuals diagnosed with language impairments can accurately distinguish between the phonemes. In addition, if the interval between two complex sounds is lengthened, individuals are better able to process the sounds distinctly.

Heretofore, the solution to the processing problem has been to place individuals with language impairments in extended special education and/or speech therapy training programs that focus on speech recognition and speech production. Or, more commonly, repetitive reading programs, phonic games, or other phonic programs are undertaken. These programs often last for years, with a success rate that is often more closely associated with the skill of the speech and language professional than with the program of study.

Another problem associated with abnormal temporal integration is one of detection. That is, modern hearing tests are not designed to evaluate whether an individual has one of the above-described masking, or integration problems. Rather, hearing tests typically determine whether an individual can hear particular frequencies, at particular amplitudes. The tests do not determine whether the individual can process short duration acoustic events in the presence of masking acoustic events. If tests indicate that an individual cannot hear particular frequencies, hearing aids may be recommended. However, hearing aids typically just amplify acoustic events within a particular frequency range, without regard to the content of the acoustic events. That is, equal emphasis is provided to all signals within a given frequency range, while acoustic signals outside of the given range (background noise for example) are eliminated.

Alternatively, tests used to determine whether an individual is language learning impaired are often provided in the form of reading tests, rather than aural tests. However, as hinted at above, failure to perform well in school, or more specifically, to properly process phonemes common in spoken language, have more to do with the processing of acoustic events than with reading. Thus, reading tests are inadequate in determining whether an individual properly processes acoustic events common in spoken language.

What is needed is a method and apparatus that acoustically screens individuals to determine whether they properly process acoustic events that are common in spoken language. More specifically, what is needed is a program that can be easily executed by individuals, of all ages, genders and nationalities, either at home or in an office, that accurately accesses their ability to process acoustic events common in spoken language.

In addition, what is needed is a program that profiles an individual's acoustic processing abilities, and determines an amount of emphasis, stretching and/or phase adjustment necessary to allow the individual to achieve acceptable comprehension of spoken language.

SUMMARY

To address the above-detailed deficiencies, the present invention provides a method for screening a human to determine his/her ability to process spoken language, the method using target/distractor phonemes that are processed using a plurality of acoustic manipulations, each of the acoustic manipulations having a plurality of processing levels. The method includes: presenting a target/distractor sequence of acoustically processed phonemes to the human; requiring the human to indicate recognition of an acoustically processed target phoneme within the sequence; recording the human's correct/incorrect indication, corresponding to the sequence; and repeating the above for each of the plurality of processing levels, for each of the plurality of acoustic manipulations. By performing the above steps an acoustic processing profile is developed for the human.

In another aspect, the present invention provides a method for testing a human to determine his/her ability to distinguish between target/distractor acoustic parameters that are common in spoken language, the method using a computer attached to speakers, the computer for processing the target/distractor acoustic parameters according to a plurality of selectable acoustic manipulations, each of the acoustic manipulations having a plurality of processing levels. The method includes: providing a computer program to the human, for execution on the computer, the computer program containing the target/distractor acoustic parameters, and computer instructions to process the target/distractor acoustic parameters according to the selectable acoustic manipulations. The method also includes executing the computer program on the computer. Execution of the program on the computer includes: selecting one of the plurality of acoustic manipulations, and one of its plurality of processing levels for processing the target/distractor acoustic parameters; presenting a sequence to the human that contains the processed target/distractor acoustic parameters; recording whether the human distinguished between the processed target and distractor acoustic parameters presented in the sequence; and repeating the above for each of the plurality of processing levels, for each of the plurality of acoustic manipulations.

BRIEF DESCRIPTION OF THE DRAWINGS

These and other objects, features, and advantages of the present invention will become better understood with regard to the following description, and accompanying drawings where.

DETAILED DESCRIPTION

Figure 1:
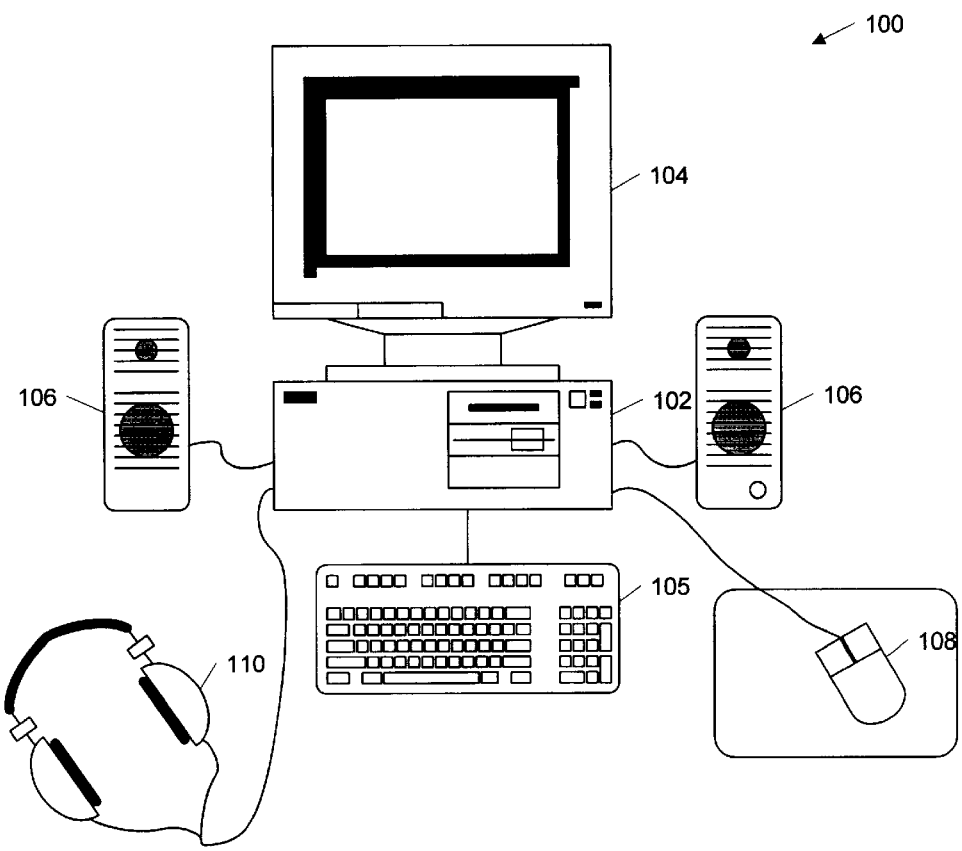
FIG. 1 is a block diagram of a computer system for executing a program according to the present invention.

Referring to FIG. 1, a computer system 100 is shown for executing a computer program to test a subject to determine whether they have auditory discrimination problems, and to measure the parameters associated with their discrimination, according to the present invention. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. The speakers 106 and the headphones 110 provide auditory prompting and feedback to the subject during execution of the computer program. The mouse 108 allows the subject to navigate through the computer program, and to select particular responses after visual or auditory prompting by the computer program. The keyboard 105 allows the subject to enter alpha numeric information into the computer 102. Although a number of different computer platforms are applicable to the present invention, embodiments of the present invention execute on either IBM compatible computers or Macintosh computers.

Figure 2:
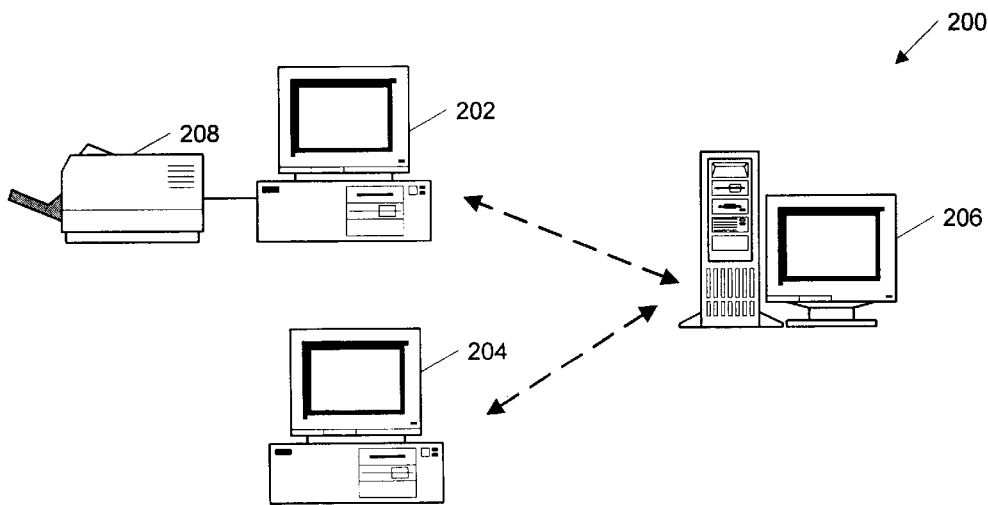
FIG. 2 is a block diagram of a computer network for executing a program according to the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows a computer program according to the present invention, and information derived from execution of the computer program, such as test scores, and other subject information, to flow between a server 206 to a subject's computer 202, 204. An administrator can then review the information and can then download user profile information, and control information associated with the user profile, back to the subject's computer 202, 204. Details of the type of information passed back to the subject's computer 202, 204 will be further described below.

Before providing a detailed description of the present invention, a brief overview of certain components of speech will be provided, along with an explanation of how these components are processed by LLI subjects. Following the overview, general information on speech processing will be provided so that the reader will better appreciate the novel aspects of the present invention.

Figure 3:
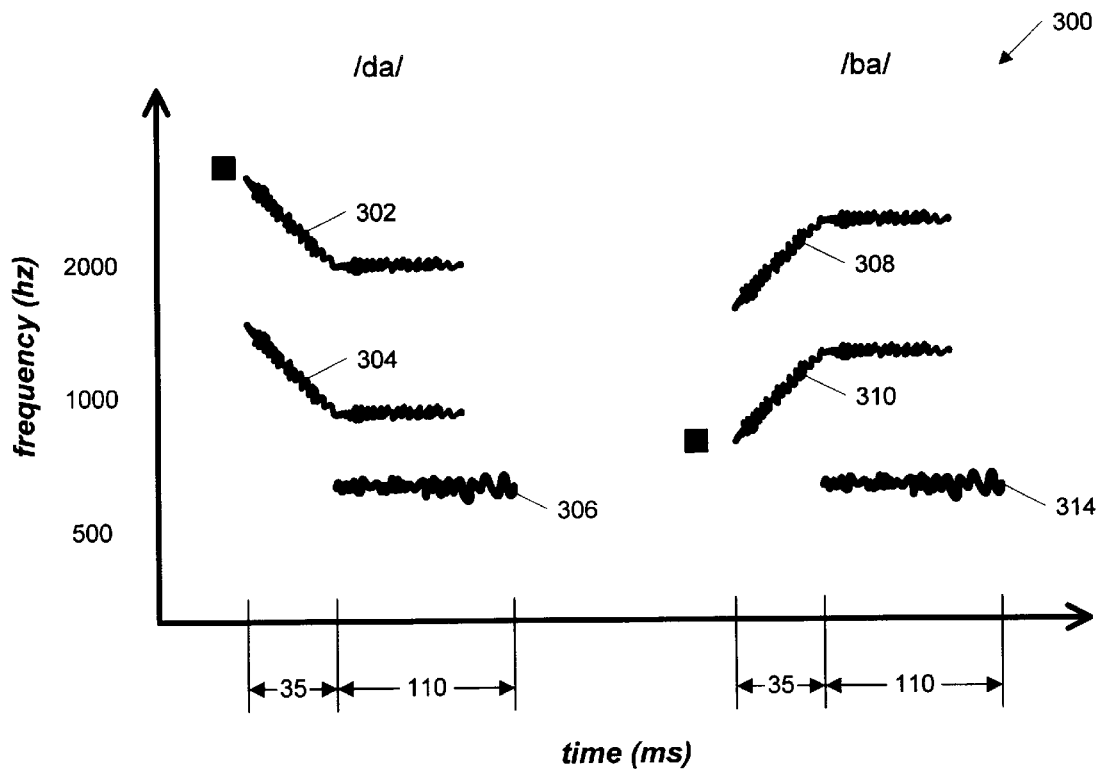
FIG. 3 is a chart illustrating frequency/energy characteristics of two phonemes within the English language.

Referring to FIG. 3, a chart is shown that illustrates frequency components, over time, for two distinct phonemes within the English language. Although different phoneme combinations are applicable to illustrate features of the present invention, the phonemes /da/ and /ba/ are shown. For the phoneme /da/, a downward sweep frequency component 302, at approximately 2.5–2 khz is shown to occur over a 35 ms interval. In addition, a downward sweep frequency component 304, at approximately 1 khz is shown to occur during the same 35 ms interval. At the end of the 35 ms interval, a constant frequency component 306 is shown, whose duration is approximately 110 ms. Thus, in producing the phoneme /da/, the stop consonant portion of the element /d/ is generated, having high frequency sweeps of short duration, followed by a long vowel element /a/ of constant frequency.

Also shown are frequency components for a phoneme /ba/. This phoneme contains an upward sweep frequency component 308, at approximately 2 khz, having a duration of approximately 35 ms. The phoneme also contains an upward sweep frequency component 310, at approximately 1 khz, during the same 35 ms period. Following the stop consonant portion /b/ of the phoneme, is a constant frequency vowel portion 314 whose duration is approximately 110 ms.

Thus, both the /ba/ and /da/ phonemes begin with stop consonants having modulated frequency components of relatively short duration, followed by a constant frequency vowel component of longer duration. The distinction between the phonemes exist primarily in the 2 khz sweeps during the initial 35 ms interval. Similarity exists between other stop consonants such as /ta/, /pa/, /ka/ and /ga/.

Figure 4:
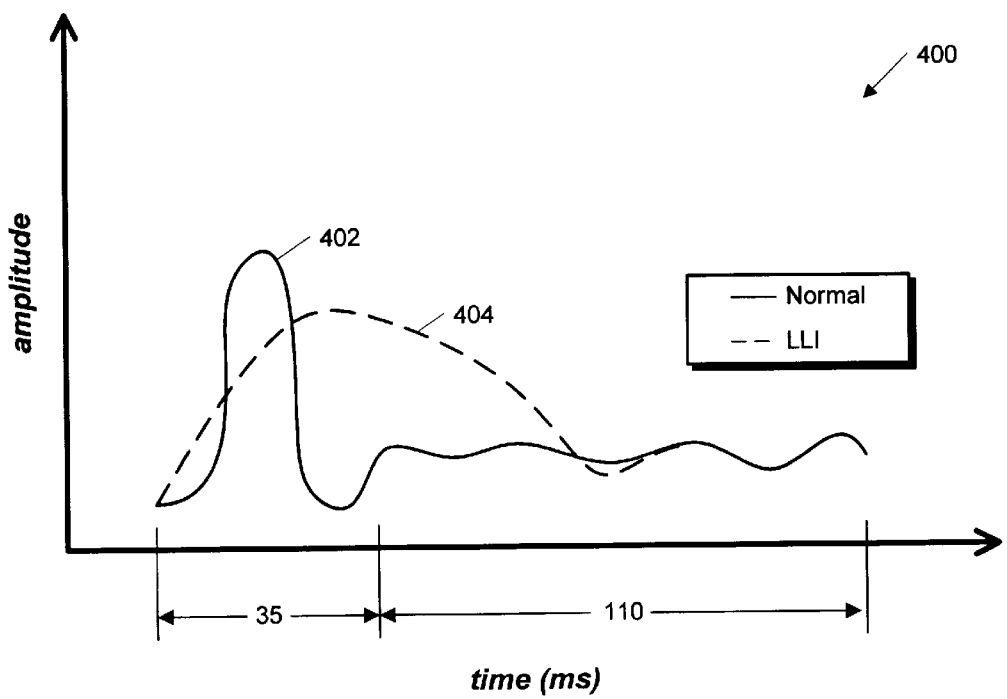
FIG. 4 is a chart illustrating auditory reception of a phoneme by a subject having normal receptive characteristics, and by a subject whose receptive processing is impaired.

Referring now to FIG. 4, the amplitude of a phoneme, for example /ba/, is viewed in the time domain. A short duration high amplitude peak waveform 402 is created upon release of either the lips or the tongue when speaking the consonant portion of the phoneme, that rapidly declines to a constant amplitude signal of longer duration. For an individual with normal temporal processing, the waveform 402 will be understood and processed essentially as it is. However, for an individual who is learning-language impaired, or who has abnormal temporal processing, the short duration, higher frequency consonant burst will be integrated over time with the lower frequency vowel, and depending on the degree of impairment, will be heard as the waveform 404. The result is that the information contained in the higher frequency sweeps associated with consonant differences, will be muddled, or indistinguishable.

With the above general background of speech elements, and how LLI subjects process them, a general overview of speech processing will now be provided. As mentioned above, one problem that exists in LLI subjects is the inability to distinguish between short duration acoustic events. If the duration of these acoustic events are stretched, in the time domain, it is possible for the LLI subjects to properly distinguish between similar acoustic events. An example of such time domain stretching is shown in FIG. 5, to which attention is now directed.

Figure 5:
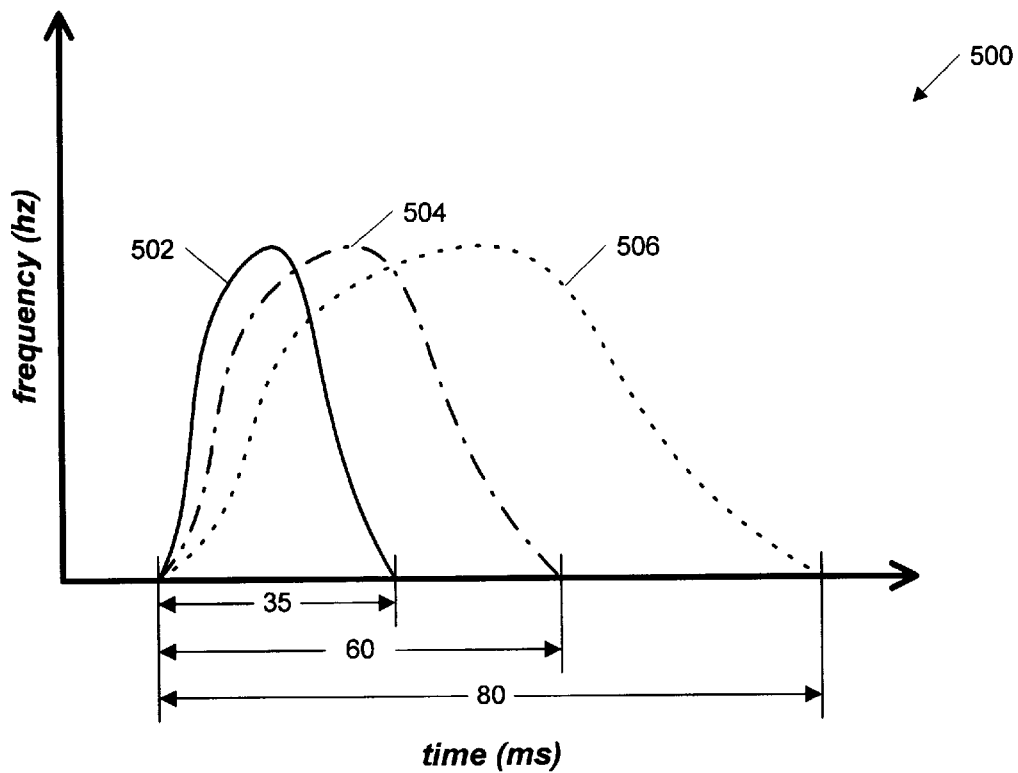
FIG. 5 is a chart illustrating stretching of a frequency envelope in time, according to the present invention.

In FIG. 5, a frequency vs. time graph 500 is shown that illustrates a waveform 502 having short duration characteristics similar to the waveform 402 described above. Using existing computer technology, the analog waveform 502 is sampled and converted into digital values (using a Fast Fourier Transform, for example). The values are then manipulated so as to stretch the waveform in the time domain to a predetermined length, while preserving the amplitude and frequency components of the modified waveform. The modified waveform is then converted back into an analog waveform (using an inverse FFT) for reproduction by a computer, or by some other audio device. The waveform 502 is shown stretched in the time domain to durations of 60 ms (waveform 504), and 80 ms (waveform 506). By stretching the consonant portion of the waveform 502 without effecting its frequency components, subjects with LLI can begin to hear distinctions in common phonemes.

Figure 6:
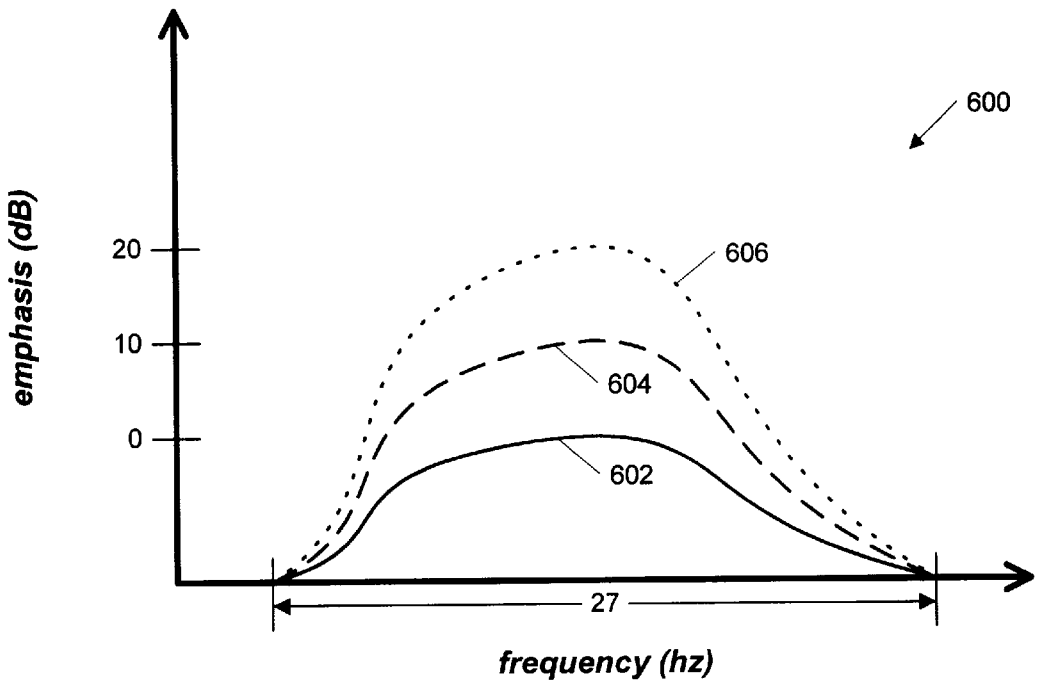
FIG. 6 is a chart illustrating emphasis of selected frequency components, according to the present invention.

Another method that is used to help LLI subjects distinguish between phonemes is to emphasize selected frequency envelopes within a phoneme. Referring to FIG. 6, a graph 600 is shown illustrating a frequency envelope 602 whose envelope varies by approximately 30 hz. By detecting frequency modulated envelopes that vary from say 1–30 Hz, similar to frequency variations in the consonant portion of phonemes, and selectively emphasizing those envelopes, they are made more easily detectable by LLI subjects. A 10 dB emphasis of the envelope 602 is shown in waveform 604, and a 20 dB emphasis in the waveform 606.

Figure 7:
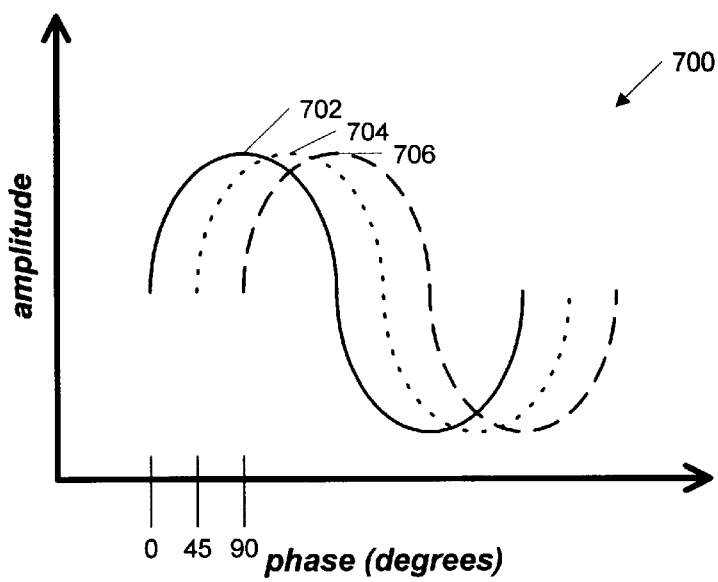
FIG. 7 is a chart illustrating phase adjustment of a selected acoustic event, according to the present invention.

A third method that is used to assist an LLI subject in distinguishing between similar short duration acoustic events is to modulate the base frequency of the consonant portion of a phoneme with a pre-selected noise signal (such as white noise), thereby creating an incoherence in phase between the consonant and vowel portion of a phoneme. Referring to FIG. 7, a graph 700 is provided illustrating a signal 702 that is shown shifted in phase by 45 degrees (704), and by 90 degrees (706).

More specifically, presuming that the base frequency of a speaker's voice is 500 Hz, if this base frequency is modulated with a proper noise source, for the first 30–40 ms of the phoneme, the phase of the consonant portion of the phoneme could be adjusted to be between −90 and 90 degrees out of phase with the base frequency of the vowel portion of the phoneme. By adjusting the phase of the consonant portion of the phoneme, relative to the base frequency of the speaker, the acoustic content of consonant portion is thereby enhanced, or made more distinguishable.

Each of the above described methods have been combined in a unique fashion by the present invention to provide a method and apparatus for testing subjects to determine whether they have abnormal temporal processing abilities associated with recognizing and distinguishing short duration acoustic events that are common in speech. The present invention is to be used as a screening program, similar to a Snelling eye exam, to quickly determine whether an individual's temporal processing abilities are within a normal range. In addition, the screening program is to be used in conjunction with a computer program entitled Fast ForWord by Scientific Learning Corporation. The screening program provides a series of auditory tests to a subject to determine the subject's ability to process short duration acoustic events that are common in spoken language, and to indicate particular deficiencies in the subject's processing of phonemes. Once the screening program has characterized the subject's processing deficiencies, training can be developed that is particularly tailored to the subject's deficiencies.

The computer screening program according to the present invention is provided to an LLI subject via a CD-ROM that is input into a general purpose computer such as that described above with reference to FIG. 1. Alternatively, the screening program may be downloaded to the subject's computer via an Internet connection, either as a stand-alone application, or as a plug-in to an Internet web browser. Specifics of the present invention will now be described with reference to FIGS. 8–12.

Execution of the screening program begins upon initiation by a subject, typically when the subject presses a button on a computer mouse, or on a keyboard. Once begun, the program presents the subject with a number of trials that require the subject to distinguish a target phoneme from within a sequence of distractor phonemes, and to indicate identification of the target phoneme, by pressing or releasing a button on the computer mouse, for example.

More specifically, a first trial might present the subject with a pictorial representation of a bow. The trial might then present an audio stream of distractor phonemes, having similar phonetic qualities to the word bow (such as "tow"). The target phoneme "bow" is located within the audio stream. For example, the audio stream might look like: tow, tow, tow, tow, tow, bow, tow. When the subject hears the target phoneme, s/he indicates recognition of the target by pressing a button on a computer mouse. The trial is then repeated using a different target/distractor pair. In one embodiment, the target/distractor phoneme pairs that are used include the consonants "b, d and t" in combination with the vowels "a, o and e".

For a complete description of audio stream construction similar to that described above, please refer to U.S. Pat. No. 5,927,988, Ser. No. 08/982189 (Docket SLC:707A) entitled "METHOD AND APPARATUS FOR TRAINING OF SENSORY AND PERCEPTUAL SYSTEMS IN LLI SUBJECTS", which is hereby incorporated by reference. U.S. Pat. No. 5,927,988 provides a thorough discussion on how such a trial stream is created and played for a subject, and how the subject is required to indicate his/her response.

The universal screening program selectively manipulates the acoustic characteristics of phonemes for each of the trials presented to the subject. In one embodiment, the consonant portion of the target and distractor phonemes is emphasized, or de-emphasized, as will be further described below, before being presented to the subject. Upon completion of each trial, the program records the type of manipulation used for the trial, the target/distractor pair used for the trial, and whether the subject correctly identified the target phoneme. The program then develops a profile corresponding to the subject's performance that indicates whether the subject has abnormal processing abilities, and if so, what the optimum processing parameters are to provide the subject with best chance of distinguishing between phonemes common in spoken language.

Figure 8:
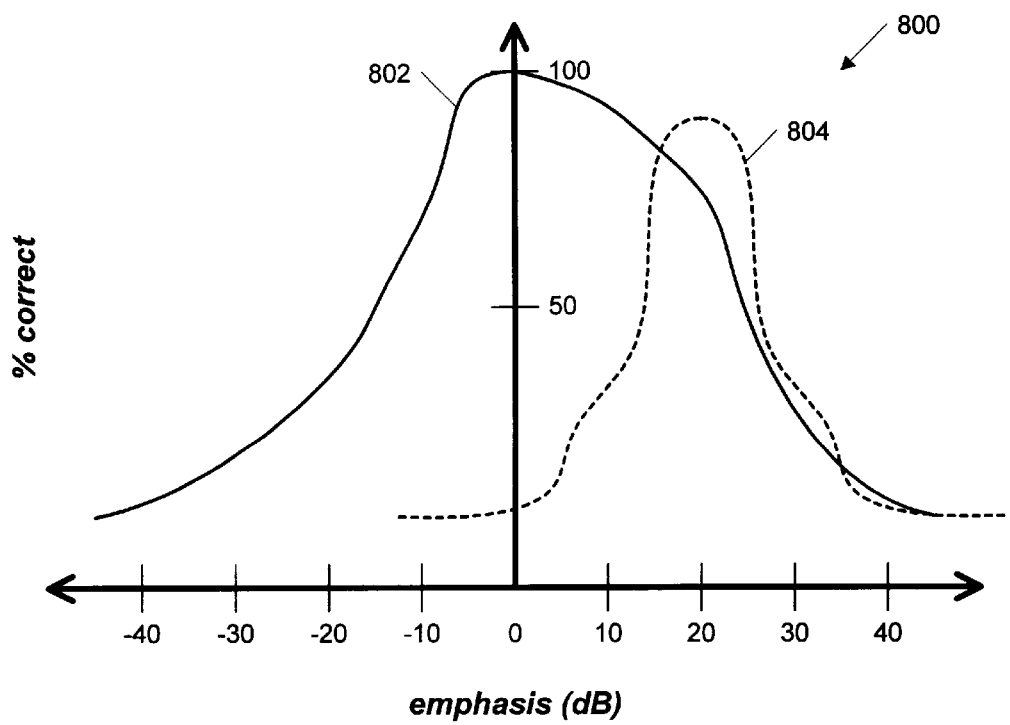
FIG. 8 is a graph illustrating hypothetical subject profiles when emphasis is applied to enhance particular portions of phonemes.

Referring to FIG. 8, a graph 800 is shown that illustrates two profiles 802, 804 associated with two hypothetical subjects. The x-axis of the graph 800 corresponds to the amount of emphasis (dB) that is applied to the consonant portion of the target/distractor phonemes. Zero (0) dB corresponds to no emphasis, or normal speech. On either side of 0 are four distinct emphasis levels including: –40, –30, –20, –10, 10, 20, 30 and 40 dB. The y-axis of the graph 800 illustrates the percent of correct target phoneme identifications for each of the processing levels. Thus, in one embodiment of the present invention, nine different processing levels are provided, ranging between –40 dB and 40 dB. One skilled in the art will appreciate that the number and range of processing levels may be varied without departing from the spirit of this invention.

Profile 802 illustrates trial results for a subject that correctly identifies target phonemes, 100% of the time, when no emphasis is applied to the target/distractor pair. As the consonant portion of the target/distractor phonemes is emphasized, the subject's ability to distinguish between the target and distractor decreases. More specifically, at 20 dB emphasis, the subject correctly responds to approximately 75% of the trials. At 30 dB emphasis, the subject correctly responds to approximately 30% of the trials. As de-emphasis is applied to the target/distractor phonemes, the subject's percentage of correct identifications falls off more rapidly. Since the subject's percentage of correct responses is optimum at 0 dB emphasis, the subject is considered to have normal acoustic processing abilities, at least as the processing is related to amplitude emphasis.

Profile 804, on the other hand, illustrates trial results for a subject whose highest percentage of correct phoneme identifications occurs when the consonant portion of the target/distractor phonemes is emphasized by 20 dB. But, when emphasis is removed, or when emphasis exceeds 20 dB, the percentage of correct identifications drops dramatically. This subject is considered to abnormally process acoustic events common in spoken language.

Figure 9:
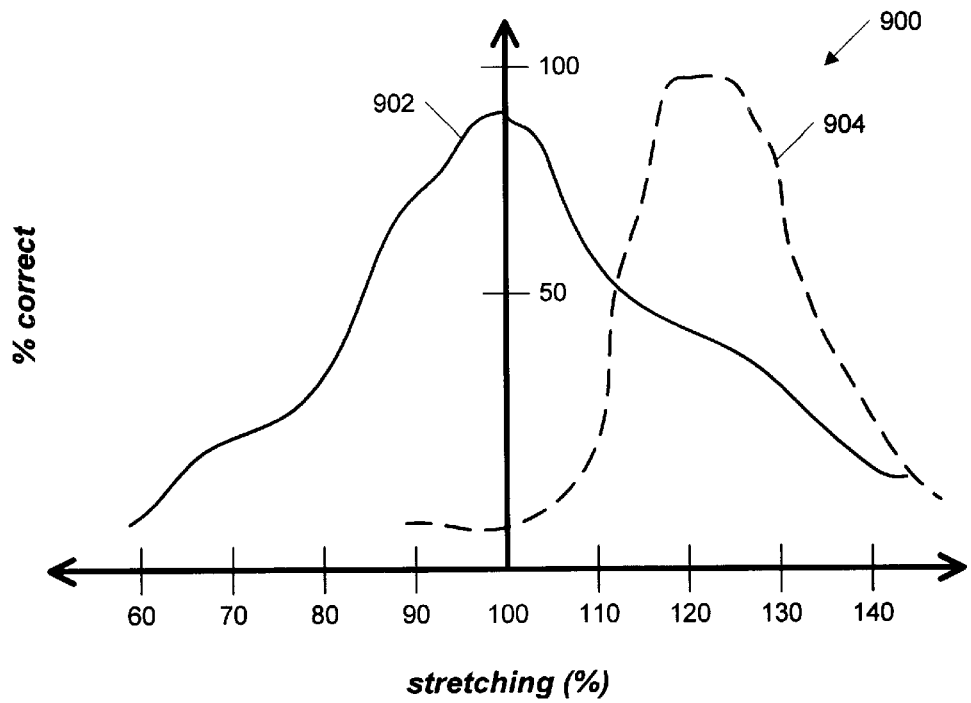
FIG. 9 is a graph illustrating hypothetical subject profiles when stretching is applied to enhance particular portions of phonemes.

Referring now to FIG. 9, a graph 900 is shown that illustrates two profiles 902, 904 associated with two hypothetical subjects. The x-axis of the graph 900 corresponds to the amount of stretching, as a percentage in time of a normal phoneme, applied to the consonant portion of the target/distractor phonemes. On hundred percent corresponds to no stretching, or normal speech. On either side of 100% are four distinct stretching levels including: 60, 70, 80, 90, 110, 120, 130 and 140 percent. The y-axis of the graph 900 illustrates the percent of correct target phoneme identifications for each of the stretching levels. Thus, in one embodiment of the present invention, nine different processing levels are provided, ranging between 60 and 140 percent.

Profile 902 illustrates trial results for a subject that correctly identifies target phonemes, 90% of the time, when no stretching is applied to the target/distractor pair. As the consonant portion of the target/distractor phonemes is stretched, the subject's ability to distinguish between the target and distractor decreases. More specifically, at 110 percent stretching, the subject correctly responds to approximately 58% of the trials. At 120 percent stretching, the subject correctly responds to approximately 42% of the trials.

As the time of the consonant portion of the target/ distractor phonemes is reduced, that is, as the phoneme reproduction is sped up, the subject's percentage of correct identifications falls more gradually than when it is stretched. Since the subject's percentage of correct responses is optimum at 0 dB emphasis, the subject is considered to have normal acoustic processing abilities, at least as the processing is related to amplitude emphasis.

Profile 904, on the other hand, illustrates trial results for a subject whose highest percentage of correct phoneme identifications occurs when the consonant portion of the target/distractor phonemes is stretched 120%. In fact, this subject's percentage of correct responses is higher at 120% stretching than the subject associated with profile 902, at 100%. But, when stretching is increased beyond 120%, or reduced to less than 120%, the percentage of correct identifications drops dramatically. This subject is considered to abnormally process acoustic events common in spoken language.

Figure 10:
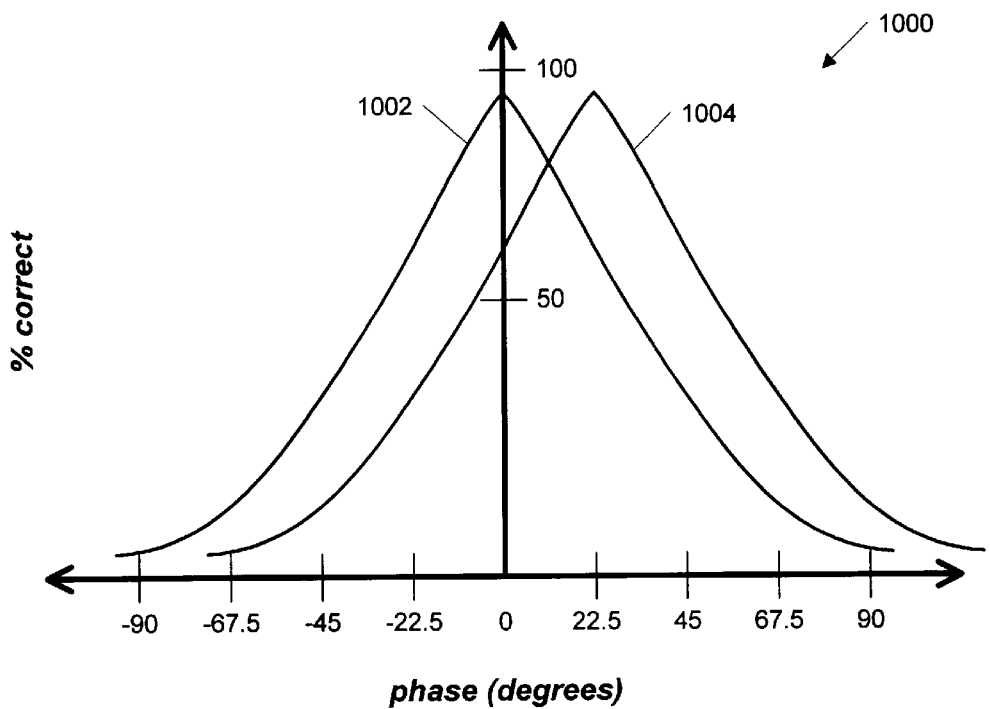
FIG. 10 is a graph illustrating hypothetical subject profiles when phase adjustments are applied to enhance particular portions of phonemes.

Referring now to FIG. 10, a graph 1000 is shown that illustrates two profiles 1002, 1004 associated with two hypothetical subjects. The x-axis of the graph 1000 corresponds to the amount of phase incoherence, applied to the consonant portion of the target/distractor phonemes. Zero (0) degrees corresponds to an in phase relationship between the consonant portion and the vowel portion of a phoneme. That is, normal speech. On either side of zero degrees are four distinct stretching levels ranging between –90 degrees and +90 degrees. The y-axis of the graph 1000 illustrates the percent of correct target phoneme identifications for each of the incoherence levels. Thus, in one embodiment of the present invention, nine different processing levels are provided, ranging between –90 degrees and +90 degrees.

Profile 1002 illustrates trial results for a subject that correctly identifies target phonemes, 95% of the time, when the consonant and vowel portions of the target/distractor pair are phase coherent. As the consonant portion of the target/ distractor phonemes made incoherent, in either direction, the subject's ability to distinguish between the target and distractor decreases. This subject is considered to normally process acoustic events common in spoken language.

Profile 1004, illustrates trial results for a subject whose highest percentage of correct phoneme identifications occurs when the consonant portion of the target/distractor phonemes is out of phase with the vowel portion by 22.5 degrees. But, when incoherence is increased beyond 22.5 degrees, or reduced to less than 22.5 degrees, the percentage of correct identifications drops. This subject is considered to abnormally process acoustic events common in spoken language.

As mentioned above, the universal screening program of the present invention provides a series of trials to a subject, the trials requiring the subject to distinguish between a target phoneme and a distractor phoneme. The target and distractor phonemes are processed according to pre-selected processing levels associated with particular acoustic manipulations. This is particularly illustrated in FIG. 11, to which attention is now directed.

Figure 11:
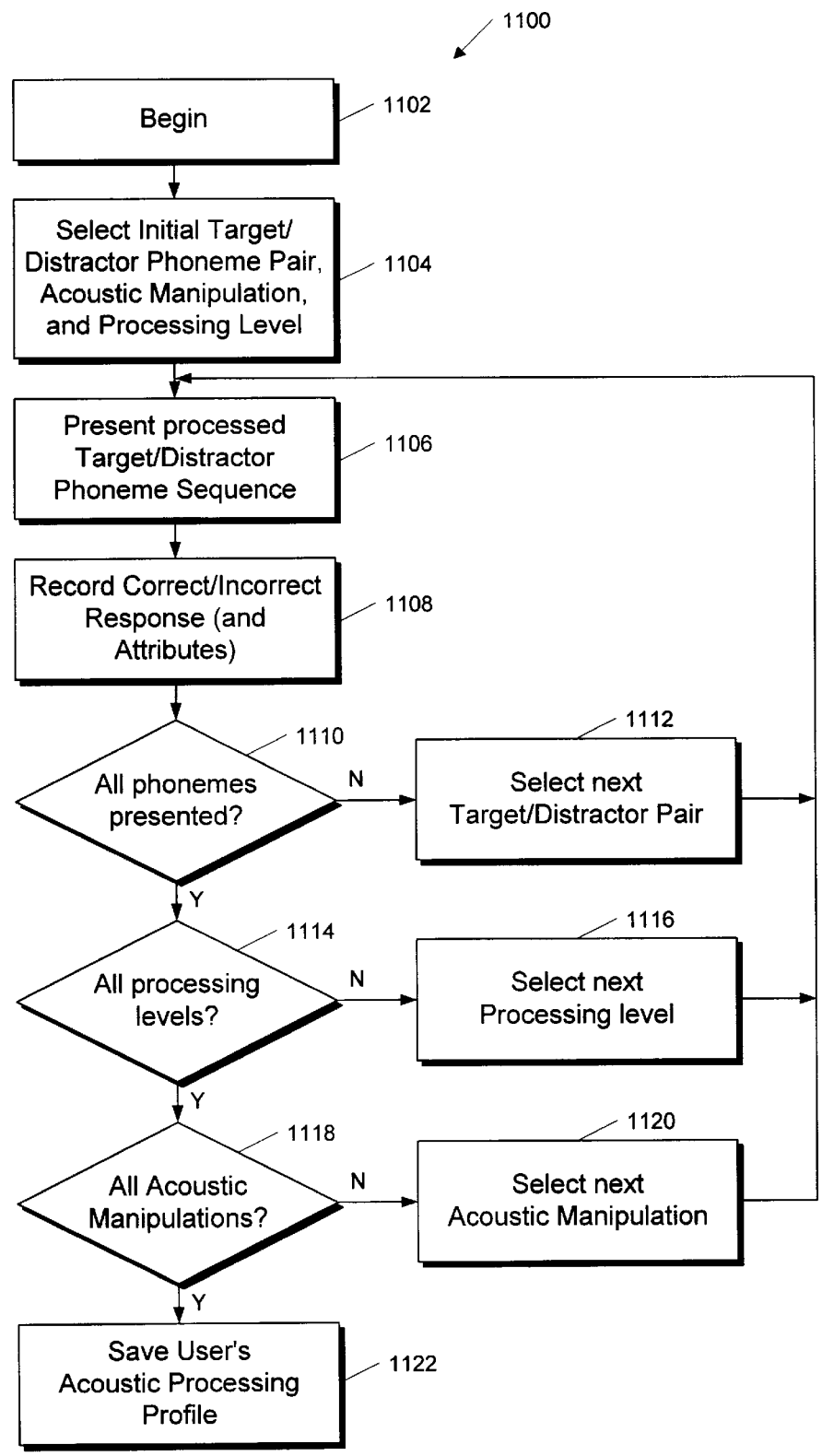
FIG. 11 is a flow chart illustrating the method of the present invention.

FIG. 11 provides a flow chart 1100 illustrating one embodiment of the method of the present invention. Flow begins at block 1102 and proceeds to block 1104.

At block 1104, the screening program begins a trial by selecting a target/distractor pair, and a phoneme manipulation type to be applied to the consonant portion of the pair. That is, the program selects either emphasis, stretching or phase incoherence to be applied to the selected pair. The program then selects the amount of manipulation (or the processing level) to be applied to the pair. Flow then proceeds to block 1106.

At block 1106, a trial sequence is built and presented to the subject in the form of an acoustically processed sequence of phonemes. The subject must then identify the processed target phoneme from within the sequence. Flow then proceeds to block 1108.

At block 1108, the result of the trial is recorded. That is, a correct response to the trial is indicated when the subject indicates recognition of the target phoneme within a relatively short time window after its presentation. In one embodiment, the subject must indicate recognition of the target phoneme prior to presentation of the next distractor phoneme, for a correct response to be recorded. Otherwise, an incorrect response is recorded for the trial. Flow then proceeds to decision block 1110.

At decision block 1110, a determination is made as to whether all target/distractor phoneme pairs have been presented for the current processing level. If not, then flow proceeds to block 1112. Otherwise, flow proceeds to decision block 1114.

At block 1112, the next target/distractor phoneme pair is selected for presentation to the subject. Flow then proceeds back to block 1106.

At decision block 1114, a determination is made as to whether all processing levels associated with the current acoustic manipulation have been presented. If not, flow proceeds to block 1116. Otherwise, flow proceeds to decision block 1118.

At block 1116, the next processing level for the current acoustic manipulation is selected. Flow then proceeds back to block 1106 where presentation of the target/distractor phoneme pairs begins again, at the new processing level.

At decision block 1118, a determination is made as to whether all acoustic manipulations have been presented. If not, flow proceeds to block 1120. Otherwise, flow proceeds to block 1122.

At block 1120, the next acoustic manipulation is selected. Flow then proceeds back to block 1106 where presentation of the target/distractor phoneme pairs begins again, using the new acoustic manipulation, at a beginning processing level.

At block 1122, all target/distractor phoneme pairs have been presented, at all processing levels, for all acoustic manipulations. The result of all recorded trials are saved into a profile for the subject that indicates the subject's optimal processing level for each acoustic manipulation.

In one embodiment, a sufficient number of trials are provided to a subject to present all of the target/distractor phoneme pairs at each manipulation level, using each type of manipulation, such that a statistically accurate representation for each type and level of manipulation is obtained. It is believed that for most individuals, the screening program can be completed in approximately 15 to 30 minutes. When complete, a three dimensional profile is built for the subject that accurately identifies: 1) whether the subject is within a range associated with normal temporal processing of acoustic events common in spoken language; and 2) if the subject is not within a normal range, what levels of processing, and what types of processing are applicable to provide the subject with optimal phoneme identification.

The profile thus provides the subject with either a passing or failing grade, with respect to their ability to process acoustic events common in spoken language. In addition, the profile provides the subject with parameters necessary to either construct a training program that is subject specific, or to build a processing device, as will be described further below.

With respect to tailoring a training program for the subject, the result of the screening program produces parameters associated with a subject's optimal processing levels for emphasis, stretching and phase coherence. These parameters may then be used by a program, such as that described in U.S. Pat. No. 5,927,988, referenced above. Thus, rather than beginning training at a processing level that makes it difficult for the subject to accurately distinguish between phonemes, the parameters of the screening program can be used to tailor the training program to begin at processing levels commensurate with a subject's profile.

In addition, the profile information obtained by the screening program may be used to tailor a processing device to process acoustic events that are common in spoken language according to a subject's optimal profile. For example, any spoken language that is presented via computer, whether it be voice mail, embedded voice within a document, news clips, downloaded audio books, etc., could first be passed through a speech processor that processes the spoken language according to the parameters provided by the subject's profile. This could significantly enhance a subject's ability to understand language presented by a computer. Moreover, since a subject's ability to process language varies with time, if the screening program were readily available to the subject, s/he could regularly test him/herself to develop an optimal profile, the results of which could be immediately used by a speech processor.

In addition, as signal processing technology is incorporated into hearing aid devices, it is possible to utilize the profile information obtained by the screening program to configure and update signal processing parameters within the hearing aids. Thus, rather than having a hearing aid that amplifies all signals equally, within a particular frequency range, the hearing aid could selectively emphasize, stretch, or alter the phase of selected portions of phonemes, according to a subject's profile.

Figure 12:
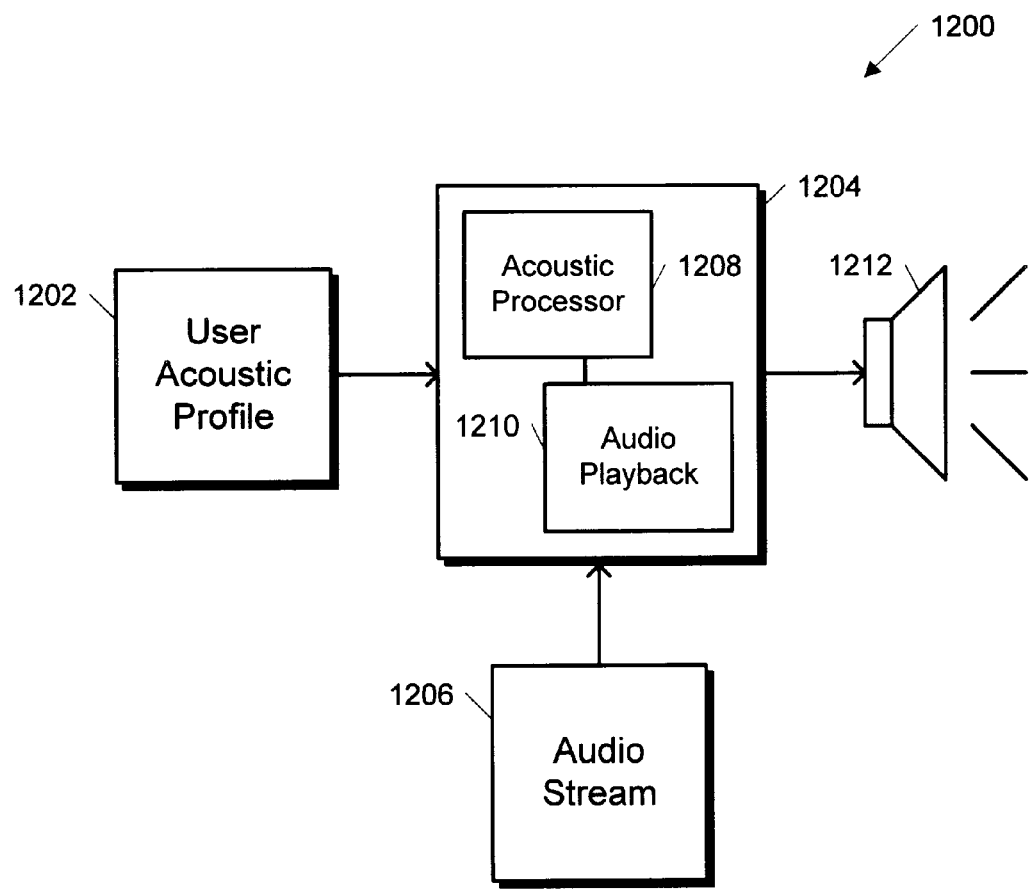
FIG. 12 is a block diagram of a hardware embodiment of the present invention.

Referring now to FIG. 12, a block diagram 1200 is shown that illustrates one hardware embodiment that utilizes the present invention. The diagram 1200 contains a user acoustic profile 1202, a listening or processing device 1204, an audio stream 1206, and a speaker 1212. Within the listening device 1204 are an acoustic processor 1208 and an audio playback device 1210. Operation of the listening device is as follows.

The listening device 1204 receives the user acoustic profile 1202 to configure the acoustic processor 1208. More specifically, the user acoustic profile 1202 provides the acoustic processor with information derived from the above screening method, such as how much emphasis, stretching, and/or phase adjustment should be applied to acoustic events, to give a user the best possible chance of distinguishing between similar sounding phonemes. For example, the user acoustic profile may indicate that the acoustic processor 1208 is to provide 10db of emphasis, and 125% stretching to incoming phonemes.

The listening device 1204 is also connected to an audio stream 1206 that represents either recorded or live acoustic information, such as a .wav file, digitized speech, or signals coming directly from a microphone. The acoustic processor 1208 receives the audio stream 1206 and applies processing to the audio stream 1206 according to the user acoustic profile 1202. Once processing is applied, the processed audio stream is provided to the audio playback device 1210.

The audio playback device (such as a sound card in a personal computer) is responsible for receiving the processed audio stream, and converting it into an analog stream suitable for playback on a speaker 1212. One skilled in the art should appreciate that the listening device 1204 could be incorporated into a personal computer, a laptop, a personal digital assistant (PDA), and as processing technology advances, even into a hearing aid.

Although the present invention and its objects, features, and advantages have been described in detail, other embodiments are encompassed by the invention. For example, one embodiment of the present invention utilizes a computer to apply emphasis, stretching and phase adjustment to present target/distractor phonemes to a subject. However, one skilled in the art should appreciate that there are many ways to manipulate speech within a computer system. Several methods are described in U.S. Pat. No. 5,927,988 referenced above. In one embodiment, a Klatt synthesizer is used to synthesize speech, according to various processing levels. In addition, to reduce the amount of memory required to generate and/or store the synthesized speech, a low pass filter of 3 khz has been used to reduce the quantity of information that must be stored for each processed phoneme. One skilled in the art should appreciate that use of a Klatt synthesizer, and a low pass filter, to provide low bandwidth synthesized speech is merely one solution to the problem of producing speech on a computer.

Furthermore, the universal screening program has been shown for execution on a personal computer, connected to a central server. However, as technology advances, it is envisioned that the program could be executed by a handheld processing device, such as a laptop, or eventually by a palmtop device such as a Nintendo GameBoy or a PalmPilot. As long as the device is capable of processing and presenting speech, and recording results, the nature of the device used to present the material is irrelevant.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for screening a human to determine his/her ability to process spoken language, the method using target/distractor phonemes that are processed using a plurality of acoustic manipulations, each of the acoustic manipulations having a plurality of processing levels, the method comprising:

a) presenting a target/distractor sequence of acoustically processed phonemes to the human;
   b) requiring the human to indicate recognition of an acoustically processed target phoneme within the sequence;
   c) recording the human's correct/incorrect indication, corresponding to the sequence; and
   d) repeating a)–c) for each of the plurality of processing levels, for each of the plurality of acoustic manipulations;
   e) wherein a)–d) develop an acoustic processing profile for the human.

2. The method for screening a human, as recited in claim 1 wherein the target and distractor phonemes have a consonant-vowel construct.

3. The method for screening a human, as recited in claim 1 wherein the plurality of acoustic manipulations comprises:

emphasis of selected frequency envelopes of the target/distractor phonemes; or stretching, in the time domain, of selected portions of the target/distractor phonemes; or phase modification of selected portions of the target/distractor phonemes.

4. The method for screening a human, as recited in claim 3 wherein emphasis acoustic manipulation provides a plurality of processing levels within the range of −40 dB and +40 dB.

5. The method for screening a human, as recited in claim 3 wherein stretching acoustic manipulation provides a plurality of processing levels within the range of 50 and 150 percent.

6. The method for screening a human, as recited in claim 3 wherein phase acoustic manipulation provides a plurality of processing levels within the range of −90 and +90 degrees.

7. The method for screening a human, as recited in claim 1 wherein the target/distractor sequence comprises a single instance of an acoustically processed target phoneme embedded within a plurality of acoustically processed distractor phonemes.

8. The method for screening a human, as recited in claim 7 wherein the acoustically processed target phoneme and the acoustically processed distractor phoneme are processed using the same acoustic manipulation at the same processing level.

9. The method for screening a human, as recited in claim 7 wherein the target phoneme does not occur first in the sequence.

10. The method for screening a human, as recited in claim 1 wherein a) is performed using a personal computing device.

11. The method for screening a human, as recited in claim 10 wherein the personal computing device is coupled to headphones.

12. The method for screening a human, as recited in claim 1 wherein the human indicates recognition of the acoustically processed target phoneme by pressing a button on a computer mouse.

13. The method for screening a human, as recited in claim 12 wherein for correct recognition of the acoustically processed target phoneme, the human must press the button on the computer mouse within a relatively short time window after presentation of the target phoneme.

14. The method for screening a human, as recited in claim 13 wherein if the human does not press the button on the computer mouse within the relatively short time window after the target phoneme is presented, an incorrect indication is recorded for the sequence.

15. The method for screening a human, as recited in claim 1 wherein b) further comprises:

b1) presenting a graphical image on a computer that corresponds to a target phoneme; and b2) requiring the human to select the graphical image when the target phoneme is presented.

16. The method for screening a human, as recited in claim 1 wherein c) further comprises:

c1) recording a correct or incorrect response for the presented sequence;

c2) recording the target/distractor phonemes presented in the sequence;

c3) recording the acoustic manipulation used to process the target/distractor phonemes; and c4) recording a processing level, for the acoustic manipulation, used to process the target/distractor phonemes.

17. The method for screening a human, as recited in claim 16 wherein c) provides the acoustic processing profile for the human.

18. The method for screening a human, as recited in claim 1 wherein the acoustic processing profile comprises a percentage of correct indications for each of the plurality of processing levels, for each of the plurality of acoustic manipulations.

19. A method for testing a human to determine his/her ability to distinguish between target/distractor acoustic parameters that are common in spoken language, the method using a computer attached to speakers, the computer for processing the target/distractor acoustic parameters according to a plurality of selectable acoustic manipulations, each of the acoustic manipulations having a plurality of processing levels, the method comprising:

a) providing a computer program to the human, for execution on the computer, the computer program containing the target/distractor acoustic parameters, and computer instructions to process the target/distractor acoustic parameters according to the selectable acoustic manipulations; and b) executing the computer program on the computer, said executing comprising:

b1) selecting one of the plurality of acoustic manipulations, and one of its plurality of processing levels for processing the target/distractor acoustic parameters;

b2) presenting a sequence to the human that contains the processed target/distractor acoustic parameters;

b3) recording whether the human distinguished between the processed target and distractor acoustic parameters presented in the sequence; and b4) repeating b1)–b3) for each of the plurality of processing levels, for each of the plurality of acoustic manipulations.

20. The method for testing a human, as recited in claim 19 wherein the target/distractor acoustic parameters are phonemes having a consonant-vowel construct.

21. The method for testing a human, as recited in claim 19 wherein the speakers attached to the computer comprise headphones.

22. The method for testing a human, as recited in claim 19 wherein the computer program is provided to the human via a CD-ROM.

23. The method for testing a human, as recited in claim 19 wherein the computer program is provided to the human via an internet connection.

24. The method for testing a human, as recited in claim 19 wherein the computer program is a plug-in to be executed within a web viewer.

25. The method for testing a human, as recited in claim 19 wherein the computer instructions to process the target/distractor acoustic parameters utilize a sound card in the computer to produce the processed target/distractor acoustic parameters.

26. The method for testing a human, as recited in claim 19 wherein the plurality of acoustic manipulations comprises:

emphasis of selected frequency envelopes of the target/distractor acoustic parameters; or stretching, in the time domain, of selected portions of the target/distractor acoustic parameters; or phase modification of selected portions of the target/distractor acoustic parameters.

27. The method for testing a human, as recited in claim 19 further comprising:

b5) creating a profile for the human that indicates an optimal processing level for each of the plurality acoustic manipulations.

28. The method for testing a human, as recited in claim 27 wherein the optimal processing level is that level where the human optimally distinguishes between the processed target and distractor acoustic parameters, at a selected one of the plurality of acoustic manipulations.

29. The method for testing a human, as recited in claim 19 wherein the human correctly distinguished between the processed target and distractor acoustic parameters if s/he indicates recognition of the processed target acoustic parameter within a relatively short time window after the target acoustic parameter is presented.

30. The method for testing a human, as recited in claim 29 wherein the time window is less than 0.5 seconds.

* * * * *